United States Patent
Bernardo

[11] 4,091,928
[45] May 30, 1978

[54] FLOWER PLANTER KIT

[75] Inventor: Anthony J. Bernardo, Brookline, Mass.

[73] Assignee: The Raymond Lee Organization, Inc., New York, N.Y.

[21] Appl. No.: 748,377

[22] Filed: Dec. 7, 1976

[51] Int. Cl.² .............................................. B65D 69/00
[52] U.S. Cl. .......................................... 206/575; 47/66; 206/423; 206/577; 249/168; 425/DIG. 239
[58] Field of Search ............... 206/575, 577, 223, 423, 206/527, 602, 216; 220/4 F, 4 D, 4 C; 249/160, 163, 164, 168; D11/149, 143, 155; 425/DIG. 239, DIG. 240, DIG. 241; 217/13, 45; 47/66; 217/12 R

[56] References Cited

U.S. PATENT DOCUMENTS

| | | | |
|---|---|---|---|
| D. 60,913 | 4/1922 | Aalyon | D11/149 |
| D. 74,064 | 12/1927 | Lindsey | D11/155 |
| 2,328,417 | 8/1943 | Brennan | 249/168 |
| 2,819,510 | 1/1958 | Vomnoroen | 249/168 |
| 3,144,932 | 8/1964 | Zerbo, Jr. | 206/575 |
| 3,674,438 | 7/1972 | Shen | 249/160 |
| 3,841,021 | 10/1974 | Ferrano | 47/66 |
| 3,877,572 | 4/1975 | Wiener | 206/577 |
| 3,921,801 | 11/1975 | Sway | 206/223 |
| 3,955,320 | 5/1976 | Serovy et al. | 47/66 |
| 4,016,676 | 4/1977 | Bennick | 47/66 |

FOREIGN PATENT DOCUMENTS

| | | | |
|---|---|---|---|
| 83,105 | 5/1964 | France | 220/4 F |

*Primary Examiner*—George E. Lowrance
*Assistant Examiner*—Bruce H. Bernstein
*Attorney, Agent, or Firm*—Howard I. Podell

[57] ABSTRACT

A kit for fabricating a flower planter of beach stones cemented together. The kit is in the form of a box that serves as a mold for the base of the planter. The box contains four shaped flat pieces that together with the box and cover form the mold for the pot section of the planter, together with a container of cement and an instruction manual.

1 Claim, 9 Drawing Figures

FLOWER PLANTER KIT

SUMMARY OF THE INVENTION

My invention is a kit for fabricating a flower planter of beach stones cemented together. The kit is in the form of a box that serves as a mold for the base of the planter. The box contains four shaped flat pieces that together with the box and cover form the mold for the pot section of the planter, together with a container of cement and an instruction manual.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
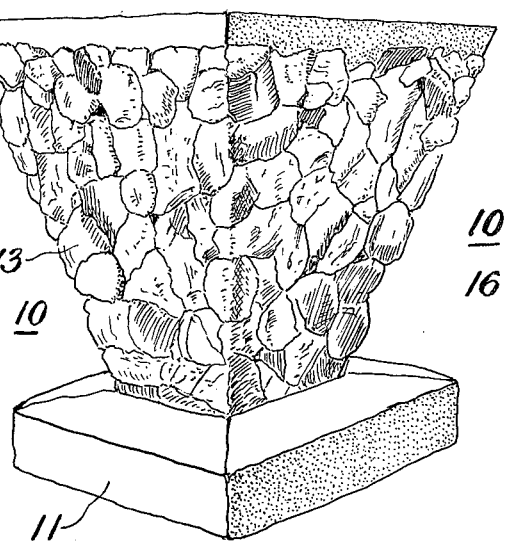
FIG. 1 is a perspective view of the fabricated flower planter.
Figure 2:
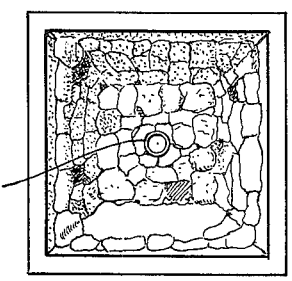
FIG. 2 is a plan view of the fabricated flower planter.

Turning now descriptively to the drawings, in which similar reference characters denote similar elements throughout the several views, FIGS. 1-2 illustrate a flower planter 10 which may be fabricated by using the kit of the invention.

Planter 10 is formed of a base section 11 of cement on which an open pot section 12 is formed of beach stones 13 embedded in cement. A drain hole 16 is formed in the base section 11.

Figure 3:
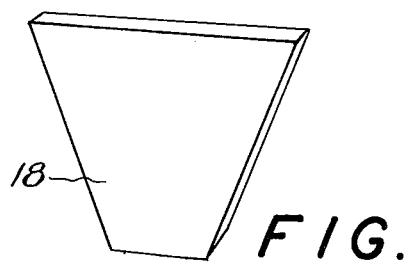
FIG. 3 is a perspective view of a mold side piece.
Figure 4:
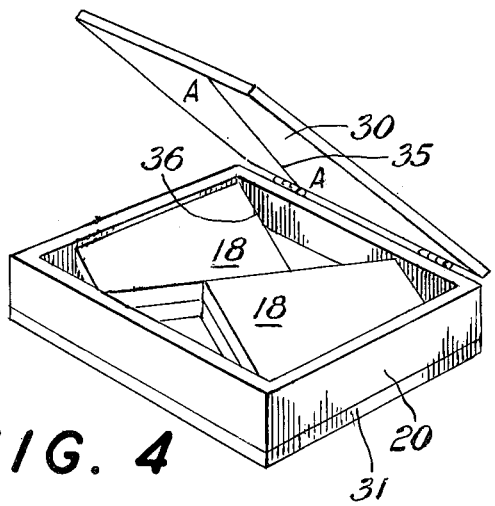
FIG. 4 is a perspective view of a mold box.
Figure 5:
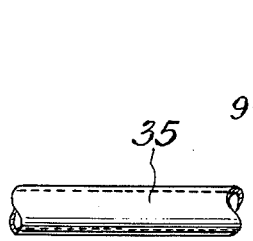
FIG. 5 is a perspective view of a drain hose.

The kit is enclosed in a box 20 fitted with a removable rectangular cover 30 shown in FIG. 4, with box 20 serving as the mold to form the base section 11 from cement contained in a can that is mixed with water. A hose 35 is vertically mounted in the base section 11 while it is being set to serve as the mold for drain hole 16.

Four flat side plates 18 are contained on the box 20 for use as a mold for the exterior of the pot section 13. Plates 18 are fastened together to form a hollow shell, and beach stones 13, originally contained in the box, are formed as wall sections inside the shell, with a mixture of cement and water troweled about the interior of the structure to hold the stones 13 in place.

A manual 25 is also contained in the box, initially, to provide detailed instructions to the user.

Alternately, box cover 30 and bottom 31 may each be marked with line 35 to outline two similar shapes A that when cut from cover 30 and bottom 31 will each be of a shape similar to a plate 18, eliminating the need for plates 18 in the kit.

Figure 7:
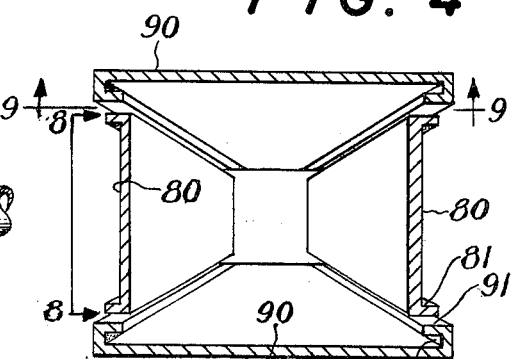
FIG. 7 is an exploded sectional view of an alternate embodiment of the assembled mold side pieces.
Figure 6:
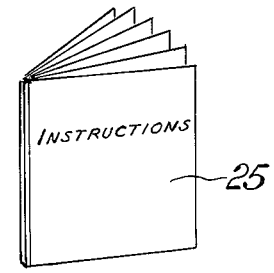
FIG. 6 is a perspective view of the instruction manual.
Figure 8:
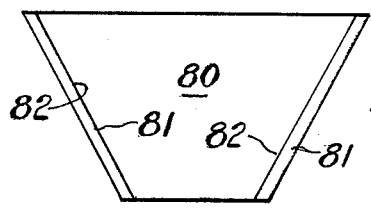
FIG. 8 is an elevation view of a male mold plate, taken along line 8—8 of FIG. 7.
Figure 9:
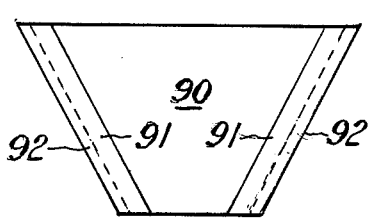
FIG. 9 is an elevation view of a female mold plate, taken along line 9—9 of FIG. 7.

An alternate form of the mold plates 80 and 90 are shown in FIGS. 7–9. Two opposed plates 80 are each joined to two opposed plates 90 by means of tongue and groove flange joints.

Male plates 80 are formed with a flange 81 on each of two opposed diagonal edges 82 that is each bent perpendicular to the plane of plate 80. Female plates 90 are formed with a U-shaped flange 91 along each of two opposed diagonal edges 92, each flange 91 enclosing a groove 92, with flanges 81 of a thickness to snugly engage the walls of a groove 93 so as to fasten the four plates 80, 90 together along their diagonal edges.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A kit for forming a planter comprising a box that houses material and serves as a mold form for use in constructing the planter from a mixture of cement and beach stones, said box shaped to serve as a mold for the base section of the planter, in which the box initially houses shaped mold forms, with said shaped mold forms in the form of four individual plates, each fitted along opposed edges of each plate with means to detachably engage an edge of another said plate, such that when so mutually engaged, the plates form the four sides of a mold, a first two of said plates formed on each of a pair of opposed edges with a U-shaped flange each bounding an open groove with the open grooves of said flanges substantially facing each other, with the second other two of each said plates formed on each of a pair of opposed edges with a male flange bent substantially perpendicular to the plane of the plate, said male flanges extending in the same direction from the plate, and each of a size to snugly engage the walls of a groove of a U-shaped flange of a first plate, such that with each male flange of a second plate engaged in a U-shaped groove flange of a first plate, with the plates arranged to form four sides of a mold, the plates are engaged together to withstand individual movement away from each other, and from the center of the mold.

* * * * *